N. A. LOCKE.
ANTIRATTLING JOINT FOR STEERING GEARS.
APPLICATION FILED JUNE 10, 1920.
1,418,005.
Patented May 30, 1922.
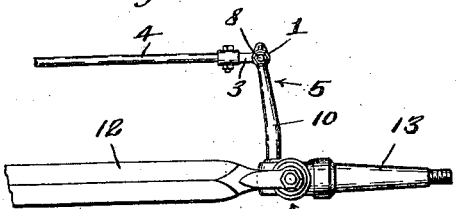
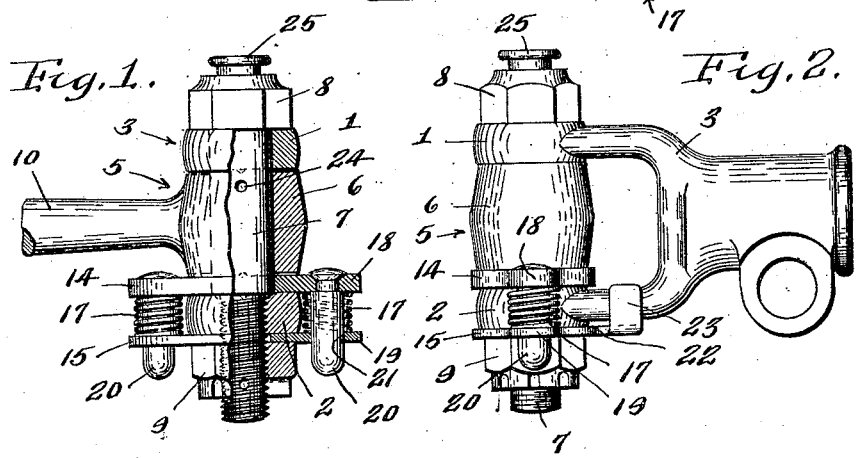
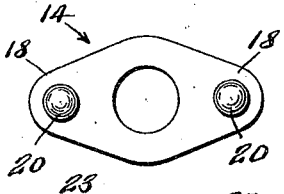
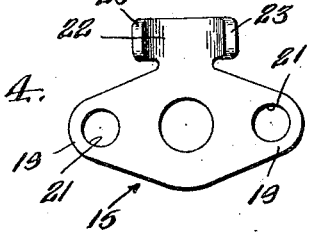
INVENTOR.
Nathen A. Locke
BY Parsons & Bodell
ATTORNEYS.

UNITED STATES PATENT OFFICE.

NATHEN A. LOCKE, OF FULTON, NEW YORK.

ANTIRATTLING JOINT FOR STEERING GEARS.

1,418,005. Specification of Letters Patent. Patented May 30, 1922.

Application filed June 10, 1920. Serial No. 387,999.

*To all whom it may concern:*

Be it known that I, NATHEN A. LOCKE, of Fulton, in the county of Oswego, in the State of New York, have invented a certain new and useful Antirattling Joint for Steering Gears, of which the following is a specification.

This invention has for its object an antirattling means for joints particularly applicable for use in the joints at the ends of the cross rod connecting the steering knuckles of motor vehicles, which anti-rattling means is particularly simple in construction, highly efficient and durable in use, and readily applied to the joint. The invention consists in the novel features and in the combinations and constructions hereinafter set forth and claimed.

In describing this invention, reference is had to the accompanying drawings in which like characters designate corresponding parts in all the views.

Figures 1 and 2 are elevations of one form of my anti-rattling joint taken at a right angle to each other, Fig. 1 being partly in section.

Figures 3 and 4 are plan views of the take-up member and the abutment member.

Figure 5 is a fragmentary plan view of a steering gear embodying my invention.

This joint comprises generally, an element, as a yoke having arms formed with alined bearings, a second element having a hub arranged between said arms, a pin extending through the bearings and the hub, and means including a member inserted between one end face of the hub and the opposing face of one of the yoke arms and tending to press the hub axially toward the other arm to take up wear and looseness.

1 and 2 are the arms of a yoke element 3 having alined bearings, the yoke being removably mounted in any suitable manner on each end of a cross rod 4 of the steering gear of a motor vehicle.

5 is second element having a hub 6 mounted between the yoke arms 1, 2, and 7 is a pivot pin extending through the bearings in the arm 1, 2 and the hub 6 and having a head 8 at one end bearing on one yoke arm and a nut 9 threading on the other end thereof. The hub is provided at the end of an arm 10 extending from the steering knuckle 17 mounted between the yoke at the end of the axle 12 and having a spindle 13 on which the ground wheel is mounted.

The means for pressing the hub axially upwardly or the yoke downwardly to take up for wear between the end faces of the hub and the yoke arms, includes a take-up member 14 inserted between one end face of the hub and the opposing face of one yoke arm as the lower arm 2, an abutment member 15 located on the opposite side of the arm 2 to that on which the member 14 mounted, and a spring tending to separate said members. As the abutment member is held from movement by any suitable means, the take-up member is forced toward the end of the hub.

These members 14, 15 are plates or washers having openings for the pin 7 and the spring is located at one side of the arm 2 and pin 7 in contradistinction to axially therewith as in my pending application, Sr. No. 356,977, filed Feb. 7, 1920.

The springs are here illustrated as coiled about studs 20 fixed to one of said members as the member 14, and projecting from the lugs 18 thereof through holes 21 on the lugs 19 of the other of said members as the abutment member 15. The studs 20 hold the members 14 and 15 from relative turning movement, and the abutment member is held from any turning movement by means connecting it to the yoke arm 2, this means being shown as an arm 22 extending along the yoke arm 2 and having lugs 23 embracing the same.

The pin 7 is formed with an oil passage running lengthwise thereof, and with one or more laterally extending ducts 24 and also with an oil cup 25 at its upper end. This pin threads through the lower arm 2 in the usual manner and the nut 9 threads on the lower end of the pin against the abutment 5 and is utilized as a convenient means to hold the abutment member from endwise movement.

In applying this device to standard equipment, the hub 2 or arm on which it is carried is removed, and one end face of the hub faced off to make room for the member 14 and the parts assembled, and in applying to new structures the hub is made to provide space for the plate 14.

Obviously, any wear on the ends of the plate is taken up by the spring pressed plate 14.

What I claim is:

1. An anti-rattling joint comprising a member having arms formed with alined bearings, a member having a hub located between said arms, a pin extending through the bearings and the hub, a take-up member encircling the pin between one end of the hub and the opposing face of one of said arms, an abutment member, encircling the pin on the opposite side of said arm, said members having laterally extending portions, coiled compression springs interposed between the laterally extending portions of said members and located on opposite sides of said arm, and a nut threading on the pin, substantially as and for the purpose specified.

2. An anti-rattling joint comprising a member having arms formed with alined bearings, a member having a hub located between said arms, a pin extending through the bearings and the hub, a take-up member encircling the pin between one end of the hub and the opposing face of one of said arms, an abutment member encircling the pin on the opposite side of said arm, said members having laterally extending portions, one of said members being provided with studs projecting from the laterally extending portions thereof, and the other member having holes through which the studs extend, springs interposed between said members and encircling the studs, and a nut threading on the pin, substantially as and for the purpose set forth.

3. An anti-rattling joint comprising a member having arms formed with alined bearings, a member having a hub located between said arms, a pin extending through the bearings and the hub, a take-up member encircling the pin and interposed between one end of the hub and the opposing face of one of said arms, an abutment member encircling the pin on the opposite side of said arm and separable from the former member and a coiled compression spring interposed between said members, substantially as and for the purpose described.

4. An anti-rattling joint having arms formed with alined bearings, a member having a hub located between said arms, a pin extending through the bearings and the hub, a take-up member encircling the pin between one end of the hub and the opposing face of one of said arms, an abutment member encircling the pin on the opposite side of said arm, and separable from the former member, coiled spring means thrusting at its opposite ends against said members and tending to force the same apart, and means for holding the members from turning movement relatively to each other and one of said members having means for engaging one of the said arms, to hold it from turning, substantially as and for the purpose specified.

5. An anti-rattling joint comprising a member having arms formed with alined bearings, a member having a hub located between said arms, a pin extending through the bearing and the hub, a take-up member encircling the pin between one end of the hub and the opposing face of one of said arms, an abutment member encircling the pin on the opposite side of said arm, said members having laterally extending portions, coiled compression springs interposed between the laterally extending portions, said members being located on opposite sides of said arm, the abutment having means for engaging one of said arms to hold said member from turning, means connecting the member for holding them from relative turning movement, and a nut threading on the pin, substantially as and for the purpose described.

In testimony whereof, I have hereunto signed my name, at Fulton, in the county of Oswego, in the State of New York, this 17th day of May, 1920.

NATHEN A. LOCKE.